United States Patent [19]

Betz et al.

[11] 4,234,604
[45] Nov. 18, 1980

[54] FEED INTAKE LIMITING FAT FOR RUMINANTS

[75] Inventors: Norman L. Betz, St. Louis, Mo.; Kent J. Lanter, Belleville, Ill.; Danny L. Williams, Manchester, Mo.

[73] Assignee: Ralston Purina Company, St. Louis, Mo.

[21] Appl. No.: 970,020

[22] Filed: Dec. 18, 1978

[51] Int. Cl.$^3$ .............................................. A23K 1/00
[52] U.S. Cl. ........................................ 426/2; 426/601; 426/608; 426/635; 426/646; 426/807
[58] Field of Search ................... 426/2, 807, 608, 601, 426/630, 635, 636, 646; 260/408, 424, 412.3

[56] References Cited

U.S. PATENT DOCUMENTS

| | | | |
|---|---|---|---|
| 1,452,553 | 4/1923 | Gardner | 260/408 |
| 2,255,230 | 9/1941 | Ross et al. | 260/408 |
| 3,669,676 | 6/1972 | Karr et al. | 426/807 |
| 4,016,296 | 4/1977 | DeSantis | 426/807 |

FOREIGN PATENT DOCUMENTS 670461 12/1938 Fed. Rep. of Germany .
825893 6/1957 Fed. Rep. of Germany .

OTHER PUBLICATIONS

Chemical Abstracts, vol. 67, 101271(c) 1967.

*Primary Examiner*—William F. Smith
*Attorney, Agent, or Firm*—Virgil B. Hill

[57] ABSTRACT

A composition for limiting feed supplement intake for ruminants is disclosed which comprises a chlorinated fat having a reacted chlorine content in an amount effective to limit intake or usually between about 0.2 and 7.0% by weight of said fat. The chlorinated fat can be incorporated into a feed supplement at a level effective to limit intake, preferably at a level exceeding 1.0% by weight, in addition to being employed with other intake limiters such as meat meal, diammonium phosphate, and ammonium sulfate in a feed supplement for intake control. The noted composition controls feed supplement intake by ruminants when added thereto permitting self-rationed feeding without waste.

25 Claims, No Drawings

FEED INTAKE LIMITING FAT FOR RUMINANTS

BACKGROUND OF THE INVENTION

This invention relates to a feed intake limiting composition for ruminants and a process for employing the same and specifically to a feed intake limiting fat which is included in a feed supplement for cattle to attain an economical and efficient means of self-feeding cattle.

In the feeding of animals on pasture, particularly cattle, it is often very advantageous from the standpoint of economics, as well as convenience, for the cattle to be self-fed, which means that the cattle are offered a feed supplement on a free choice basis without periodic feedings of a rationed amount by a farmer or rancher each day. A disadvantage, however, of self-feeding animals such as cattle is that the animals tend to over-eat feed supplements and consequently get a higher intake of supplement than is completely necessary for proper weight gain or weight maintenance. This results in an additional expense to the rancher in having to provide additional and unnecessary amounts of protein or feed supplement to be fed in combination with roughage sources such as grass or hay.

It is, therefore, desirable to limit the intake of the protein or feed supplement to an amount which is the proper amount needed for weight gain or weight maintenance without consumption of more than is needed by the animal. The prior art has incorporated salt or gypsum in the protein or feed supplement in order to control consumption of the supplement to a prescribed amount. A disadvantage, however, in employing either one of these compounds to control consumption of the supplement and accordingly provide an effective self-feeding feed composition is that both materials provide little nutritional value and require mixing in large quantities with the supplement in order to reduce consumption thereof. For example, one part of salt to three parts of protein or feed supplement will ordinarily be required to reduce daily consumption in cattle to the desired amount. Another disadvantage of employing these materials is that salt poisoning of the animals may occur if water is not freely available.

U.S. Pat. No. 3,669,676 provides a solution to the above disadvantages by describing a feed intake limiting composition for cattle comprising a mixture of fish oil, ammonium sulfate, diammonium phosphate, and meat meal. This mixture can be added to a feed supplement which can then be offered on a free choice basis to cattle in combination with a roughage source such as grass or hay. The combinations of these materials contribute to the nutrient requirements for the feed supplement as well as effectively controlling intake of the supplement to a prescribed amount. While this composition has proven to be extremely desirable and effective as an intake limiter, the availability of certain components of the mixture, as well as a continuing need for other limiters to effectively control intake as well as contribute to the nutritive properties of the feed supplement has necessitated the development of the feed intake limiting composition of the present invention.

SUMMARY OF THE INVENTION

The present invention provides an intake limiting composition, specifically an intake limiting fat, which may be added to the feed supplement for ruminants such as cattle in an amount effective to limit feed intake thereby controlling feed intake and providing a means for self-feeding cattle without excessive consumption of the supplement. The intake limiting composition of the present invention comprises a chlorinated fat having a reacted chlorine content in an amount effective to limit intake of a feed supplement or usually between about 0.2 and 7.0% by weight of said fat, with a preferred minimum level of reacted chlorine of at least about 0.5% by weight. This chlorinated fat may be employed either by itself as a feed supplement intake limiter for cattle or can be combined with at least one other intake limiting ingredient such as meat meal, diammonium phosphate, or ammonium sulfate, and added to a supplement for intake control.

If the chlorinated fat is used as the sole ingredient to control feed intake, it is normally employed in the feed supplement at a level effective to limit intake, typically at a level of at least about 0.1% by weight and preferably at a level between about 1.5 and 16% by weight depending on the degree of intake control desired. If it is employed in combination with other intake limiters such as a material selected from the group consisting of meat meal, diammonium phosphate, ammonium sulfate and combinations thereof, it may also be employed in the feed at the above levels.

Although the chlorinated fat by itself is entirely satisfactory for controlling the intake of a feed supplement for cattle. Its use in combination with the other intake limiters described above may be desirable in certain feeding programs because of the widely varying environmental conditions that cattle may be fed under, as well as because of the fact that the additional limiters also contribute to the nutritive properties of the feed supplement.

An object, therefore, of the present invention is to provide for a composition which limits feed supplement intake to a predetermined amount in order to allow self-feeding of ruminants.

It is also an object of the present invention to provide a method for limiting feed supplement intake by cattle by feeding a composition comprising an intake limiting fat which effectively controls supplement intake by cattle when fed on a free choice basis.

DESCRIPTION OF THE PREFERRED EMBODIMENTS

In accordance with the present invention a composition has been developed which is capable of limiting feed supplement consumption or intake to the amount that is necessary for proper weight maintenance of cattle. This level of intake of the feed supplement by cattle will accordingly vary depending upon the type of animals as well as the environmental conditions under which they are maintained, and the exact level of intake is not intended to limit the present invention although it is generally considered that a desirable intake for a feed supplement would be less than about 6–7 lbs. of supplement per head of cattle per day and preferably less than about 4 lbs. of supplement per head of cattle per day with a most preferred range of intake of between about 2 to 4 lbs. of supplement per head of cattle per day. The amount of intake will generally be the amount of feed supplement intake which is necessary for proper weight maintenance as well as the most efficient feed utilization by the animal.

The feed intake limiting composition of the present invention comprises a chlorinated fat having a reacted chlorine content in an amount effective to limit intake of a feed supplement or usually between 0.2 and 7.0% by weight of said fat, with a preferred minimum level of reacted chlorine of at least about 0.5%. This minimum level of chlorination of the fat will provide an intake limitation which usually is below 6–7 lbs. of supplement per head of cattle per day although the exact figure will, of course, vary depending upon various factors including the environmental conditions for feeding and the type of general state of health of the animal. Preferably, the chlorinated fat employed in the present invention will have a minimum reacted chlorine content of at least about 0.5% by weight of said fat and the reacted chlorine content typically will vary between about 0.9% to a level as high as 3.7% by weight of the fat. The most preferred range of reacted chlorine for a feed supplement intake of between 2 and 6 lbs. of supplement per head of cattle per day would be a reacted chlorine content in the fat of between about 0.9 and 1.5% by weight of said fat.

The reacted chlorine content of the fat as described in the present invention is intended to refer to the reacted or combined chlorine in the fat which occurs from chlorination of the fat with a suitable chlorinating reagent. The reacted chlorine can also be described as being in a non-ionic state which means because it is reacted or combined with the fat it would not normally be removed from the fat by a simple extraction with an aqueous or ionic type medium, although in fact, it can be removed or converted to ionic form by a mild alkaline hydrolysis of the fat.

The reacted chlorine content of the fat of the present application is typically measured by an analytical procedure which employs mild hydrolysis of the chlorinated fat with alkali to convert the chlorine present to inorganic chloride in which form it can be measured as total chloride, which represents the reacted chlorine level together with the free chlorine that is also present in the fat but in an unreacted state. The free chlorine is then separately measured by extraction of a sample of the fat with water. The free chlorine goes into the aqueous phase and upon determination of the chlorine level in the aqueous phase the calculated level of free chlorine is subtracted from the total chlorine level to provide the level of reacted chlorine (measured as chloride) in the fat.

The chlorinated fat which is employed in the present invention, either as the sole intake limiting material of the feed supplement or in combination with other intake limiting ingredients, is obtained by the chlorination of any type of fat with a chlorinating agent at an elevated temperature. The particular type of fat or oil is not critical to the practice of the present invention and various types of animal or vegetable fats or oils are suitable as starting materials for producing the chlorinated fat of the present invention. For example, typical unsaponified fats used in feed supplements which are suitable for use in the present invention include tallows or yellow grease as well as other types of animal fats. Also suitable are various unsaponified vegetable oils such as palm kernel oil, coconut oil, soybean oil, cottonseed oil, and corn oil, therefore, the present invention is not intended to be limited by the specific type of fat or oil which can be chlorinated pursuant to the present invention to produce an intake limiting material.

The intake limiting fat of the present invention is obtained by reacting an animal or vegetable fat with a chlorinating agent at an elevated temperature and for a period of time sufficient to provide a reacted or combined chlorine content in the fat of between about 0.2 and 7.0% by weight and preferably at least about 0.5% by weight or between about 0.9 and 3.7% by weight. Higher levels of reacted chlorine in a fat are attainable dependent on the amount of chloride available for reaction in the chlorinating reagent or dependent on the type of fat employed and the reactive sites on the fat for chlorination. It is contemplated to include such higher levels of reacted chlorine within the scope of the present invention to the extent they can be diluted to the desired level of reacted chlorine for the purpose of controlling feed consumption by cattle. The exact temperature and time which may be employed during the chlorination of fat is not critical to the practice of the present invention since the level of reacted chlorine will be more dependent on the theoretical amount of chloride available for reaction and type of fat as well as the manner in which the reaction is carried out. In other words, if the reaction takes place in a sealed container to prevent loss of reagent during heating of the mixture of fat and chlorinating reagent, a higher level of reacted chlorine may be attainable under the same conditions of temperature and time that do not provide for recycling of the reagent. Typically, and if desired, increased or reduced pressure may be employed to either lower the temperature for chlorination of the fat or to reduce the reaction time for chlorination of the fat. Typical and preferred temperatures for chlorination of the fat pursuant to the present invention include temperatures of around 260° F. or higher and a time for chlorination of at least about 30 minutes and preferred time of about 180 minutes at atmospheric pressure. It is not critical relative to the intake limiting properties of the chlorinated fat of the present invention how long the reaction actually takes place since this will be entirely dependent upon the quantity of fat and the type of chlorinating agent as well as the specific temperature employed. Typically, however, for purposes of commercial practice, the mixture will be heated at a temperature such that the required reacted chlorine content will be achieved as quickly as possible.

The specific types of chlorinating reagents which may be employed in the present invention are not intended to limit the same and various materials which are suitable for chlorination of organic materials and specifically fats are intended to be included within the scope of the present invention. Typical materials which may be employed include chlorine, organic chlorine compounds, or hydrochloric acid. A preferred material which may be employed as the chlorinating agent for the fat of the present invention is hydrochloric acid. If desired, various materials or catalysts to improve reactivity such as $ZnCl_2$ or $H_2SO_4$ may also be added in the needed amounts. Typical levels of hydrochloric acid which may be employed in chlorinating the fat of the present application will obviously be dependent upon the theoretical amount of chlorine available for reaction and hence the concentration of the acid employed. If, however, the concentrated hydrochloric acid is employed as the chlorinating agent, this typically contains a hydrochloric acid level of 36 to 38% by weight. Therefore, typical levels of hydrochloric acid which may be employed in chlorinating the fat of the present invention is at least about 0.6% by weight of the fat or preferably between about 4 and 10% by weight. The exact quantity of reactant which can be employed to chlorinate the fat of the present invention can be conveniently calculated dependent upon the theoretical chlorine level in the reactant as well as the time and temperature of reaction and the present invention is not intended to be limited by the specific amount or conditions for reaction. Typically, it is preferred to employ a level of hydrochloric acid of about 4% by weight and to carry out the chlorination reaction at a temperature of about 260° F. for about 1-3 hours during which a reacted or combined chlorine content of the fat of about 1.3% is usually obtained.

Following chlorination of the fat and for a better understanding of the present invention, the following analytical procedure is intended to provide a convenient means of measuring the reacted or combined chlorine in the fat following chlorination with an ionic chlorinating agent such as hydrochloric acid. The following procedure measures the total chloride in the fat which is, of course, representative of the total chlorine level in the fat both reacted and unreacted. A separate determination for free chloride in the fat is made and the reacted chlorine determined by the following relationship.

Total Chlorine Level (Chloride)—Free Chloride = Reacted Chlorine

Analysis of Total Chlorine (Chloride) Level in Fat:
Reagents:
 1. Ethanol
 2. Hexane-reagent grade n-Hexane.
 3. 50% potassium hydroxide solution-50 gm reagent grade (KOH) potassium hydroxide made up to 100 ml of volume with deionized water.
 4. Nitric Acid-concentrated nitric acid.
Equipment:
 1. Water bath capable of achieving temperatures between 55°-65° C.
 2. Hot plates.
 3. Reflux condensors.
 4. Suitable tubing.
 5. 250 ml boiling flasks.
 6. Ring stands and clamps.
 7. Top loading balance, accurate to 0.01 gm.
 8. 250 ml beakers.
 9. 250 ml separatory funnels.
 10. 100 ml graduated cylinders.
 11. Boiling beads.
 12. 200 ml volumetric flasks, or suitable size.
 13. Cold water (10° C. ±5° C.) to be circulated through condensors.
 14. Disposable funnels.
 15. Whatman #'filter paper, 11.0 cm.
 16. pH meter.
 17. Stirring bars, magnetic.
Procedure for Sampling Fat:
 1. Liquefy fat sample in a 55°-65° C. water bath.
 2. Shake thoroughly by hand until sample appears to be homogeneous.
 3. Weigh 2 gm±0.01 gm into 250 ml boiling flask for the total chloride determination as set forth below. Separately weigh 15 gm±0.01 gm into a 250 ml beaker for the free chloride determination as set forth below.
Total Chloride Determination:
 1. Add 30 ml ethanol, 5 ml 50% KOH and a few boiling beads to the 250 ml boiling flasks containing the 2 gm fat sample.
 2. Attach cold water condenser, heat to gentle boiling and reflux 15 minutes.
 3. Cool the refluxed samples by rinsing the condenser with deionized water.
 4. Transfer the samples to a 250 ml beaker with deionized water.
 5. Adjust samples to pH of 6.0±0.5 with concentrated nitric acid.
 6. Cool sample if necessary to room temperature.
 7. Filter sample through a Whatman #40 filter paper into an appropriate sized volumetric flask, rinsing the beaker and filter paper with deionized water.
 8. Make flask to volume with water and make the necessary dilutions for the titration and determination of chloride content as set forth below.
Free Chloride Determination:
 1. To the 15 gm sample of fat in a 250 ml beaker add 50 ml hexane and transfer to a 250 ml separatory funnel.
 2. Add additional 50 ml hexane to beaker and repeat transfer.
 3. Rinse the beaker with 100±1 ml of distilled water and transfer to separatory funnel.
 4. Stopper the separatory funnel and shake for 1 minute.
 5. Allow phases to separate and collect aqueous phase for determination of chloride content as set forth below.
Determination of Chloride Content:
Reagents
 1. Nitric acid-acetic acid—make 10 ml concentrated nitric acid and 160 ml glacial acetic acid to 400 ml volume with deionized water.
 2. Gelation Reagent-Dissolve 0.62 gm of gelatin in 100 mls hot deionized water. Store in refrigerator but allow solution to warm to room temperature before each use.
 3. Standard Stock Solution-weigh 1.0000 gm of sodium chloride, previously dried at 110° C. for 1 hour and cooled in a desiccator for 1 hour in a 1000 ml volumetric flask and bring to volume with water.
Equipment
 1. Automatic Chloride Titrator, Aminco-Cotlove Co.
 2. Titration vials
 3. Volumetric pipettes, assorted sizes
Procedure
 1. Prepare a blank by placing 4.0 ml of deionized water into titration vial, add 1.0 ml nitric-acetic acid reagent and 4 drops gelatin. (Run at least 2 blanks.)
 2. Prepare blank by placing 4.0 ml from each standard solution which has been prepared from the stock standard solution to contain effectively 10 ppm, 25 ppm, 50, 100, 150, and 200 ppm into titration vials. Add 1.0 ml nitric-acetic acid reagent and 4 drops gelatin to each vial.
 3. Prepare each unknown sample by placing 4.0 ml of each sample into a titration vial followed by the addition of 1.0 ml of nitric-acetic acid reagent and 4 drops gelatin.
 4. Place the vial in position and turn titration switch to position #1. The stirrer will start and the indicator pointer should fall within 10-30 seconds to a stable value of less than 5 microamperes.
 5. Set the timer to zero.
 6. Set the adjustable pointer to 10 microamperes above the indicator pointer.
 7. Turn titration switch to position #2.
 8. Record the time shown at end of titration.

9. Make sure samples are diluted sufficiently to represent values shown on the standard curve.

Standard Curve Preparation

1. From stock standard solution pipette 2 and 5 ml and place in separate 200 ml volumetric flasks. Bring to volume with deionized water and shake well. This provides a working standards of 10 and 25 ppm, respectively.
2. From the stock solution pipette 5, 10, 15, 20 and 25 ml and place in separate 100 ml volumetric flasks. Bring to volume with deionized water and shake well. This provides working standards of 50, 100, 150, 200, and 250 ppm, respectively.

Calculations

Calculations may be performed manually by preparing a graphical plot of concentration vs. seconds (titration time). The graph will provide a linear relationship between titration time and concentration, therefore, the concentration of the unknown samples may be determined by extrapolation on the graph.

The total chlorine minus the free chloride equals the amount of reacted or combined chlorine in the fat. The above procedure is not intended to limit the process of the present invention, but is set forth merely to illustrate an appropriate analytical procedure for measurement of the combined or reacted chlorine content achieved pursuant to the process of the present invention.

If the chlorinated fat is employed with other intake limiters such as ammonium sulfate, the feed intake limiting composition will contain sufficient ammonium sulfate so that the feed supplement to which the intake limiting composition is added will contain between about 0.1 and 5% by weight of ammonium sulfate, although preferably the amount of ammonium sulfate may be varied between 1 and 4% to achieve a preferred level of intake limitation when used in combination with preferred amounts of other ingredients of the intake limiting composition. The type of ammonium sulfate which may be employed in the present invention is not critical to its practice and it may be of generally any type considered suitable for feed use.

The feed intake limiting composition of the present invention may also contain sufficient diammonium phosphate so that the feed supplement to which the composition is added will contain between about 0.1–5% by weight of diammonium phosphate. The preferred amount of diammonium phosphate which may be added is between about 2 and 5% by weight in order to achieve the preferred level of intake limitation when used in combination with preferred amounts of other ingredients of the intake limiting composition. Likewise, the present invention is not limited by the type or purity of diammonium phosphate which may be employed and any source of this material normally considered suitable for feed use may be used in the present invention. The intake limiting composition of the present invention may also contain, if desired, an ingredient such as meat meal, or an equivalent, dry ground meat scraps or meat by-products in such an amount that the feed supplement to which this composition is added will contain between about 0.1 to 20% by weight of meat meal. Preferably the amount of meat meal may be varied between 3 and 17% by weight of the feed supplement to also achieve the preferred level of intake limitation when used in combination with preferred amounts of other ingredients of the intake limiting composition.

The feed intake limiting composition of the present invention may be added to the feed supplement or in the event more than one intake limiter is used, the individual components of the noted composition may be separately mixed and combined or mixed individually with the feed supplement. Furthermore, the feed supplement to which the intake limiting compositions of the present invention are added may be any feed material generally intended to provide the full nutritional requirements of the animal with the exception of, in the case of cattle, the various roughage sources which are considered to be necessary for proper nutrition. Therefore, the feed supplement to which the intake limiting composition of the present invention may be added will consist of the various grains which can be categorized as predominantly farinaceous or proteinaceous grains as the case may be. Included among those suitable proteinaceous materials are the vegetable protein materials such as soybean, cottonseed or peanuts. These materials are considered to be highly utilizable sources of protein for animals. Likewise, various farinaceous materials which contain a lower percentage of protein may also be employed since these additionally contribute to the protein requirement of the feed supplement and among those materials which are suitable are grains such as corn, milo, alfalfa, or various wheat materials or wheat by-products. If desired, the feed supplement may additionally contain various non-protein nitrogen sources which ruminant animals specifically utilize to convert to microbial protein. The addition of this type of material provides a cheap and effective source of nitrogen in a ruminant diet.

The feed supplement will also typically contain various minerals which are considered to be essential for animals such as cattle, as well as various vitamins, either fat or water soluble, which typically are added to feed supplements for a complete nutritional balance.

A further ingredient which may be employed in the present invention are various medicaments which may be added to the feed supplement either for the purpose of disease control or for improving performance. Materials of this type include additives such as antimycotics, bacteriostats, hormones and the like.

For the most effective results, the feed supplement will be fed to cattle in combination with various cellulosic roughage sources such as grass, hay, or silage and the present invention is not intended to be limited insofar as any specific roughage sources to be used in combination with the feed supplement containing the intake limiting compositions of the present invention. It should be recognized that the particular roughage source which may be utilized in the present invention will be generally dictated by the local availability of various forage crops. The protein or feed supplement containing the intake limiting composition of the present invention may be fed in any manner or form considered to be suitable for feeding animals such as cattle. For example, the feed supplement containing intake limiting composition may be fed in meal or mash form or may be shaped into pellets or cubes or may be compressed into large blocks and offered to cattle grazing on a pasture or a range. It is preferred, however, to feed or administer the supplement containing the intake limiting composition in meal or mash form in such a manner that the cattle have free and ready access to it. It is believed, although this is not intended to be a controlling or limiting factor in the present invention, that the intake limiting properties of the present composition is more effective when fed in a meal form as opposed to a pellet or cube form.

It is also preferred although not intended to limit the practice of the present invention that if an acidic chlorination reagent such as hydrochloric acid is employed and is not completely removed from the reaction mixture by distillation or similar means that the pH be adjusted to within the range of 4.0 to 7.0 for ease of handling. This avoids handling problems without adversely affecting intake limiting properties of the fat. For the purposes of a full and complete disclosure, the following Examples are set forth as illustrative rather than limiting embodiments of the present invention.

EXAMPLE 1

A chlorinated fat was prepared by taking 2,354 lbs. of bleachable fancy tallow and adding 10% by weight of concentrated hydrochloric acid (36% HCL). This mixture was heated for 4 hours and 5 minutes until it achieved a temperature of 260° F. The mixture was held at this temperature for a period of 3 hours and the pH was adjusted to 5.2 with sodium hydroxide solution. Analysis of the chlorinated fat for reacted chlorine by the procedure set forth above indicated a level of reacted chlorine of 1.36% by weight. This fat was added to the three dry feed supplements set forth below at varying levels:

| Supplement | A | B | C |
|---|---|---|---|
| Ingredient (% by weight) | | | |
| Cracked Milo | 66.15 | 64.90 | 64.01 |
| Dehydrated Alfalfa | 5.00 | 5.00 | 5.00 |
| Wheat Midds | 1.00 | 1.00 | 1.00 |
| Soybean Meal | 10.70 | 10.70 | 10.70 |
| Calcium Carbonate | 1.40 | 1.40 | 1.40 |
| Dicalcium Phosphate | 5.10 | 5.10 | 5.10 |
| Salt | 5.00 | 5.00 | 5.00 |
| Urea | 2.90 | 2.90 | 2.90 |
| Vitamins and Minerals Premix | .75 | 1.50 | .89 |
| Chlorinated Animal Fat | 2.00 | 2.50 | 4.00 |

The supplements identified as "C" and "B" were fed to 16 and 15 head of cattle respectively for a period of 21 days and the average consumption measured.

The supplements identified as "C" and "A" were fed to 16 and 15 head of cattle respectively for a period of 84 days and the average consumption expressed as lb./head/day measured.

The results are as follows:

| Supplement | Time Period | Cows | Consumption |
|---|---|---|---|
| A | 84 | 15 | 2.7 |
| C | 84 | 16 | 1.1 |
| B | 21 | 15 | 0.8 |
| C | 21 | 16 | 0.7 |

EXAMPLE 2

The chlorinated fat produced pursuant to Example 1 was added to a feed supplement having the following formula.

| Ingredient | % by Weight |
|---|---|
| Cracked Milo | 65.89 |
| Dheydrated Alfalfa | 5.00 |
| Wheat Midds | 1.00 |
| Soybean Meal | 10.70 |
| Calcium Carbonate | 1.40 |
| Dicalcium Phosphate | 5.10 |
| Salt | 5.00 |
| Urea | 2.90 |
| Vitamins & Minerals | .51 |
| Chlorinate Fat | 2.50 |

The above supplement was fed in two separate trials to separate groups of 21 cows grazing on native grass for a period of 71 days. Average consumption expressed as lb./head/day of the feed supplement was determined to be the following:

| Trial | Cows | Days | Consumption |
|---|---|---|---|
| 1 | 21 | 71 | 2.9 |
| 2 | 21 | 71 | 2.4 |

EXAMPLE 3

A chlorinated fat was prepared by taking 1,989 lbs. fo bleachable fancy tallow and adding 199 lbs. (10% by weight) of concentrated hydrochloric acid (36% HCL). This mixture was heated for 7 hours until a temperature of 260° F. was reached. The mixture was held at this temperature for a period of 3 hours and the pH of the fat was adjusted to 5.3 with sodium hydroxide solution. Analysis of the chlorinated fat for reacted chlorine by the procedure set forth above indicated a level of reacted chlorine of 2.17% by weight. The fat was added to the dry feed supplement set forth below.

| Ingredient | % by Weight |
|---|---|
| Cracked Milo | 56.63 |
| Dehydrated Alfalfa | 5.43 |
| Wheat Midds | 10.00 |
| Soybean Meal | 13.59 |
| Dicalcium Phosphate | 2.40 |
| Salt | 5.00 |
| Urea | 2.80 |
| Vitamins & Minerals | .15 |
| Chlorinated Fat | 4.00 |

The above supplement was fed to cattle in four separate feeding trials set forth below and the average consumption expressed as lbs/head/day per trial measured.

| Trial | Number of Cows | Days | Average Consumption |
|---|---|---|---|
| 1 | 6 | 12 | 3.3 |
| 2 | 6 | 5 | 2.5 |
| 3 | 7 | 5 | 3.6 |
| 4 | 7 | 4 | 3.2 |

EXAMPLE 4

A chlorinated fat was prepared by taking 2,000 lbs. of bleachable fancy tallow and adding 203 lbs. (10% by weight) of concentrated hydrochloric acid (36% HCL). This mixture was heated for 4 hours and 15 minutes until it reached a temperature of 260° F. The mixture was held at this temperature for a period of 3 hours and the pH of the fat was adjusted to 6.5 with sodium hydroxide solution. Analysis of the chlorinated fat by the procedure set forth above indicated a level of reacted chlorine of 1.26% by weight.

The fat was added to a dry feed supplement having the formula set forth in Example 3 in an amount of 4% by weight. The supplement was fed in two separate feeding trials set forth below and the average consumption expressed as lbs/head/day per trial measured.

| Trial | Number of Cows | Days | Average Consumption |
|---|---|---|---|
| 1 | 6 | 5 | 3.6 |
| 2 | 6 | 12 | 4.1 |

EXAMPLE 5

3,006 lbs. of bleachable fancy tallow was mixed with 120 lbs. (4% by weight) of concentrated hydrochloric acid (34.1% HCL) in a vessel that could be sealed to permit pressure buildup. The mixture was heated for 45 minutes to reach a temperature of 260° F. and a pressure of 16-19 psi. The mixture was held at this temperature and pressure for 3 hours. Analysis of the chlorinated fat for reacted chlorine by the procedure set forth above indicated a level of reacted chlorine of 1.18% by weight. The fat was then added to a dry feed supplement having the following formula:

| Ingredient | % by Weight |
|---|---|
| Cracked Milo | 56.63 |
| Dehydrated Alfalfa | 5.43 |
| Wheat Midds | 10.00 |
| Dicalcium Phosphate | 2.40 |
| Salt | 5.00 |
| Soybean Meal | 13.59 |
| Urea | 2.80 |
| Vitamins & Minerals | .15 |
| Chlorinated Fat | 4.00 |

The above supplement was fed to 16 cows for a period of 5 days and the average consumption by the cows determined. The average consumption by the cows for this feeding trial was determined to be 2.7 lbs/head/day.

EXAMPLE 6

3,000 lbs. of bleachable fancy tallow was mixed with 120 lbs. (4% by weight) of concentrated hydrochloric acid (34.1% HCL) in a vessel that could be sealed to permit pressure build up upon heating. The mixture was then heated for 1 hour to achieve a temperature of 260° F. and a pressure of 16-18 psi. The mixture was held at this temperature and pressure for 1 hour and 10 minutes. Analysis of the chlorinated fat for reacted chlorine by the procedure set forth above indicated a level of reacted chlorine of 1.11% by weight. The fat was then added to a dry feed supplement having the formula set forth in Example 5 in an amount of 4% by weight. This supplement was fed to 16 cows for a 5 day period and the average consumption of the supplement determined to be 3.3 lbs/head/day.

EXAMPLE 7

A chlorinated fat was prepared by taking 150 grams of soybean oil and adding 6 grams (4% by weight) of concentrated hydrochloric acid (36% HCL). This mixture was heated as rapidly as possible to a temperature of 260° F. and held at this temperature for a period of 3 hours. Analysis of the chlorinated fat for reacted chlorine by the procedure set forth above indicated a level of reacted chlorine of 1.10% by weight.

EXAMPLE 8

A chlorinated fat was prepared by taking 150 grams of corn oil and adding 6 grams (4% by weight) of concentrated hydrochloric acid (36% HCL). This mixture was heated as rapidly as possible to a temperature of 260° F. and held at this temperature for a period of 3 hours. Analysis of the chlorinated fat for reacted chlorine by the procedure set forth above indicated a level of 1.12% reacted chlorine in the fat.

EXAMPLE 9

A chlorinated fat was prepared by taking 150 grams of bleachable fancy tallow and adding 6 grams (4% by weight) of concentrated hydrochloric acid (36% HCL). The mixture was placed in a pressure bottle and reacted at 212° F. for 67 hours. Analysis of the chlorinated fat for reacted chlorine indicated a reacted chlorine content of 1.26% by weight.

EXAMPLE 10

A chlorinated fat was prepared by taking 150 grams of bleachable fancy tallow and 6 grams (4% by weight) of concentrated hydrochloric acid (36% HCL). The mixture was heated at a temperature 320°-329° F. for a period of 2 hours and 15 minutes. Analysis of the chlorinated fat for reacted chlorine indicated a level of reacted chlorine of 1.23% by weight.

EXAMPLE 11

A chlorinated fat was prepared by taking 2,426 lbs. of bleachable fancy tallow and adding 243 lbs. (10% by weight) of concentrated hydrochloric acid (36% HCL). The mixture was heated for 1 hour and 55 minutes until a temperature of 260° F. was achieved. The mixture was then held at this temperature for a period of 3 hours. The pH of the fat was adjusted to 5.8 with sodium hydroxide solution. Analysis of the chlorinated fat for reacted chlorine by the procedure set forth above indicated a level of reacted chlorine of 0.63% by weight.

This fat was then added to a dry feed supplement having the formula set forth in Example 5 in an amount of 4% by weight of the supplement. The supplement was then fed in feeding trials as set out below and average consumption (lbs/head/day) determined.

| Trial | Number of Cows | Days | Average Consumption |
|---|---|---|---|
| 1 | 36 | 3 | 7.2 |
| 2 | 6 | 4 | 6.0 |
| 3 | 6 | 11 | 6.4 |

EXAMPLE 12

A chlorinated fat was prepared by taking 5.0 lbs. of the fat produced in Example 1 and adding 1.5 lbs. of the chlorinated fat produced in Example 11. Analysis of the mixture for reacted chlorine by the procedure set forth above indicated a level of reacted chlorine in the mixture of 0.80% by weight. The mixture was added to the dry feed supplement set forth in Example 5 in an amount of 4% by weight.

This supplement was then fed to 8 cows for a period of 2 days and the average consumption of the cows determined to be 6.7 lbs/head/day.

It is intended to include within the scope of the present invention such modifications and variations as would be apparent to one skilled in the art without a departure from the scope of the appended claims.

What is claimed is:

1. A feed intake limiting composition for ruminants to control consumption of a feed supplement when added thereto comprising a material selected from the group consisting of meat meal, diammonium phosphate, ammonium sulfate, and combinations thereof and an intake limiting ingredient comprising a chlorinated fat having a reacted chlorine content of between about 0.2 and 3.7% by weight of said fat.

2. The composition of claim 1 wherein the reacted chlorine content is between about 0.9 and 3.7% by weight.

3. The composition of claim 1 wherein the reacted chlorine content is between about 0.9 and 1.5% by weight of said fat.

4. The composition of claim 1 wherein the level of meat meal is about 0.1–20% by weight of said supplement.

5. The composition of claim 1 wherein the level of ammonium sulfate is about 0.1–5% by weight of said supplement.

6. The composition of claim 1 wherein the level of diammonium phosphate is about 0.1–5% by weight of said supplement.

7. A feed supplement for ruminants containing an intake limiting composition, said feed supplement comprising grain, said intake limiting composition being present in an amount effective to limit intake and comprising a chlorinated fat having a reacted chlorine content in an amount effective to limit intake of said supplement but not exceeding 3.7% by weight of said fat.

8. A feed supplement for ruminants containing an intake limiting composition said feed supplement comprising grain, said intake limiting composition being present in an amount effective to limit intake of said supplement and comprising a chlorinated fat having a reacted chlorine content of between about 0.2 and 3.7% by weight of said fat.

9. The feed supplement of claim 8 wherein the amount of said composition effective to limit intake is at least about 1.0% by weight of said supplement.

10. The feed supplement of claim 8 wherein the amount of said composition effective to limit intake is between about 1.5 and 16% by weight of said supplement.

11. The feed supplement of claim 8 wherein said chlorinated fat has pH of 4.0 to 7.0.

12. The feed supplement of claim 8 wherein the chlorinated fat has a reacted chlorine content of between about 0.9 and 3.7% by weight of said fat.

13. The feed supplement of claim 8 wherein the chlorinated fat has a reacted chlorine content of between about 0.9 and 1.5% by weight of said fat.

14. The feed supplement of claim 8 wherein said fat is selected from the group consisting of animal and vegetable fats.

15. A feed supplement for ruminants containing an intake limiting composition, said feed supplement comprising grain, said intake limiting composition comprising a material selected from the group consisting of meat meal, diammonium phosphate, ammonium sulfate and combinations thereof and an intake limiting ingredient comprising a chlorinated fat having a reacted chlorine content of between about 0.2 and 3.7% by weight of said fat.

16. The composition of claim 15 wherein the level of chlorinated fat in said supplement is at least about 1.0% by weight of said supplement.

17. The composition of claim 15 wherein the level of meat meal is 0.1 to 20% by weight of said supplement, the level of ammonium sulfate is between about 0.1–5% by weight of said supplement, and the level of diammonium phosphate is between about 0.1–5% by weight of said supplement.

18. The feed supplement of claim 15 wherein the chlorinated fat has a reacted chlorine content of between about 0.9 and 3.7% by weight.

19. The feed supplement of claim 15 wherein the chlorinated fat has a reacted chlorine content of between about 0.9 and 1.5% by weight.

20. The feed supplement of claim 15 wherein the chlorinated fat is selected from the group consisting of animal and vegetable fats.

21. A method of self-feeding ruminants by limiting feed supplement intake to a predetermined amount which comprises feeding, at a level effective to limit intake of said supplement, a chlorinated fat having a reacted chlorine content of between about 0.2 and 3.7% by weight of said fat.

22. The method as set forth in claim 21 wherein the reacted chlorine content is between about 0.9 and 3.7% by weight.

23. The method as set forth in claim 21 wherein the amount of said fat effective to limit intake is at least about 1.0% by weight of said supplement.

24. The method as set forth in claim 21 wherein the amount of said fat effective to limit intake is between about 1.5 and 16% by weight of said supplement.

25. The method as set forth in claim 21 wherein a material selected from the group consisting of meat meal, diammonium phosphate, ammonium sulfate, and combinations thereof is added to said supplement.

* * * * *